United States Patent
Gianelli

(10) Patent No.: US 12,174,312 B2
(45) Date of Patent: Dec. 24, 2024

(54) ORDERED-STATISTICS RATIO (OSR) CONSTANT FALSE ALARM RATE (CFAR) DETECTION WITH EMPIRICAL DATA FITTING

(71) Applicant: Aptiv Technologies AG, Schaffhausen (CH)

(72) Inventor: Christopher David Gianelli, La Porte, IN (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 371 days.

(21) Appl. No.: 17/814,659

(22) Filed: Jul. 25, 2022

(65) Prior Publication Data

US 2023/0341513 A1    Oct. 26, 2023

Related U.S. Application Data

(60) Provisional application No. 63/363,407, filed on Apr. 22, 2022.

(51) Int. Cl.
*G01S 7/292* (2006.01)
*G01S 7/35* (2006.01)

(52) U.S. Cl.
CPC .......... *G01S 7/2927* (2013.01); *G01S 7/2926* (2013.01); *G01S 7/354* (2013.01)

(58) Field of Classification Search
CPC ...... G01S 7/2927; G01S 7/2926; G01S 7/354; G01S 7/356; G01S 13/34; G01S 13/42;
(Continued)

(56) References Cited

U.S. PATENT DOCUMENTS 7,642,951 B2   1/2010 Onorato
9,157,992 B2 * 10/2015 Wang ..................... G01S 13/04
(Continued)

FOREIGN PATENT DOCUMENTS

| CN | 107271973 B | 5/2020 |
| EP | 3978947 A1 | 4/2022 |
| WO | 2018098234 A1 | 5/2018 |

OTHER PUBLICATIONS

"Extended European Search Report", EP Application No. 23160243.4, Sep. 11, 2023, 8 pages.
(Continued)

*Primary Examiner* — Olumide Ajibade Akonai
*Assistant Examiner* — Yonghong Li
(74) *Attorney, Agent, or Firm* — Harness, Dickey & Pierce, P.L.C.

(57) ABSTRACT

Empirical data fitting with Ordered Statistic Constant False Alarm Rate (CFAR) detection is described. An empirical approach is used to derive data for indicated expected target responses to provide a CFAR in a variety of different noise distributions. Multiple (e.g., at least two) ordered-statistics are extracted from radar data, which are then used identify a ratio for mapping to an appropriate CFAR multiplier of quantile function for a distribution at hand. Empirical data fitting evaluates an ordered-statistic ration (OSR) against expected OSR values. From evaluating the expected OSR values derived from multiple test frames, a mapping between measured OSR values and their appropriate CFAR multiplier is derived. Through this empirical data fitting, a radar system can perform CFAR detection to account for shape shifts or other variations in a noise distribution beyond just fluctuations in noise strength.

20 Claims, 8 Drawing Sheets

(58) Field of Classification Search
CPC .... G01S 13/536; G01S 13/584; G01S 13/931; G01S 7/4008; G01S 7/4017; G01S 7/4021; G01S 7/4086
See application file for complete search history.

(56) References Cited

U.S. PATENT DOCUMENTS

| | | | |
|---|---|---|---|
| 2017/0192088 A1* | 7/2017 | Fluhler | G01S 7/2922 |
| 2019/0041494 A1 | 2/2019 | Roger et al. | |
| 2021/0165090 A1* | 6/2021 | Lee | G01S 13/931 |
| 2021/0208270 A1* | 7/2021 | Raghavan | G01S 7/414 |
| 2022/0120855 A1* | 4/2022 | Rosu | G01S 13/34 |

OTHER PUBLICATIONS

Ai, et al., "A New Two Parameter CFAR Ship Detector in Log-Normal Clutter", May 2017, pp. 0195-0199.

Drumheller, et al., "A Parameter-Insensitive False Alarm Rate Detection Processor", Jun. 1, 2001, 27 pages.

Jakeman, et al., "Significance of K-Distributions in Scattering Experiments", pp. 546-550.

Evanon, et al., "Order Statistics CFAR for Weibull Background", Jun. 1990, pp. 157-162.

Ravid, et al., "Maximum-likelihood CFAR for Weibull background", IEE Proceedings F, vol. 139, No. 3, Jun. 1992, pp. 256-264.

Rohling, "Radar CFAR Thresholding in Clutter and Multiple Target Situations", IEEE Transactions on Aerospace and Electronic Systems, vol. AES-19, No. 4, Jul. 1983, pp. 608-621.

Rohling, et al., "Ordered Statistic CFAR Technique—an Overview", 2011, 8 pages.

Rohling, et al., "OS CFAR Performance in a 77GHz Radar Sensor for Car Application", Oct. 1996, pp. 109-114.

Weber, et al., "Ordered Statistic CFAR Processing for Two-Parameter Distributions with Variable Skewness", Nov. 1985, 3 pages.

* cited by examiner

ORDERED-STATISTICS RATIO (OSR) CONSTANT FALSE ALARM RATE (CFAR) DETECTION WITH EMPIRICAL DATA FITTING

CROSS-REFERENCE TO RELATED APPLICATION

This application claims the benefit of U.S. Provisional Patent Application No. 63/363,407, filed Apr. 22, 2022, which is incorporated by reference herein in its entirety.

BACKGROUND

Accuracy in radar data can be improved by consistently accounting for variations in noise behavior. A low, constant false alarm rate (CFAR) is achievable using a CFAR detector to compensate a detection analysis for varying noise patterns. Adjustments to a noise floor applied during detection identification are made in response to changes in operating conditions (e.g., noise parameters). The adjustments can be based on noise models tuned for certain ambient noise patterns that the CFAR detector is likely to encounter. When applied to detection identification, the noise floor adjustments prevent false detections from being output, even as characteristics of ambient noise in an operating environment change. While existing CFAR detectors may prevent most false detections in many common driving environments, ambient noise can be highly attenuated and unpredictable. Existing CFAR detectors may have difficulty maintaining a low CFAR in many situations in which noise behaves inconsistently with the expectations of a noise model.

SUMMARY

This document describes Ordered-Statistics Ratio (OSR) CFAR detection with empirical data fitting. In one example, a radar system is configured to apply an empirical approach to derive data for indicated expected target responses to provide a CFAR in a variety of different noise distributions. Multiple (e.g., at least two) ordered-statistics are extracted from radar data, which are then used identify a ratio for mapping to an appropriate CFAR multiplier of quantile function for a distribution at hand. Empirical data fitting evaluates an ordered-statistic ration (OSR) against expected OSR values. From evaluating the expected OSR values derived from multiple test frames, a mapping between measured OSR values and their appropriate CFAR multiplier is derived. Through this empirical data fitting, a radar system can perform CFAR detection to account for shape shifts or other variations in a noise distribution beyond just fluctuations in noise strength.

This Summary is not intended to identify essential features of the claimed subject matter, nor is it intended for use in determining the scope of the claimed subject matter. In addition to this and other examples, methods and techniques are described for OSR CFAR detection with empirical data fitting. In some cases, a computer-readable media (CRM) includes instructions that, when executed, cause a processor (e.g., of a radar system) to perform these methods. Systems are contemplated by this disclosure that include various means for performing these methods. Through implementation of these and other examples contemplated by this disclosure, OSR CFAR detection with empirical data fitting can improve radar accuracy, and as such, improve performance of vehicle functions, which depend on noiseless radar data, thereby enabling safe driving.

BRIEF DESCRIPTION OF THE DRAWINGS

The details for OSR CFAR detection with empirical data fitting are described in this document with reference to the Drawings that may use same numbers to reference like features and components, and hyphenated numbers to designate variations of these like features and components. The Drawings are organized as follows:

FIGS. 3-1 and 3-2 illustrate a flow diagram of an example process for performing OSR CFAR detection with empirical data fitting, in accordance with the described techniques.

DETAILED DESCRIPTION

Introduction

Figure 1:
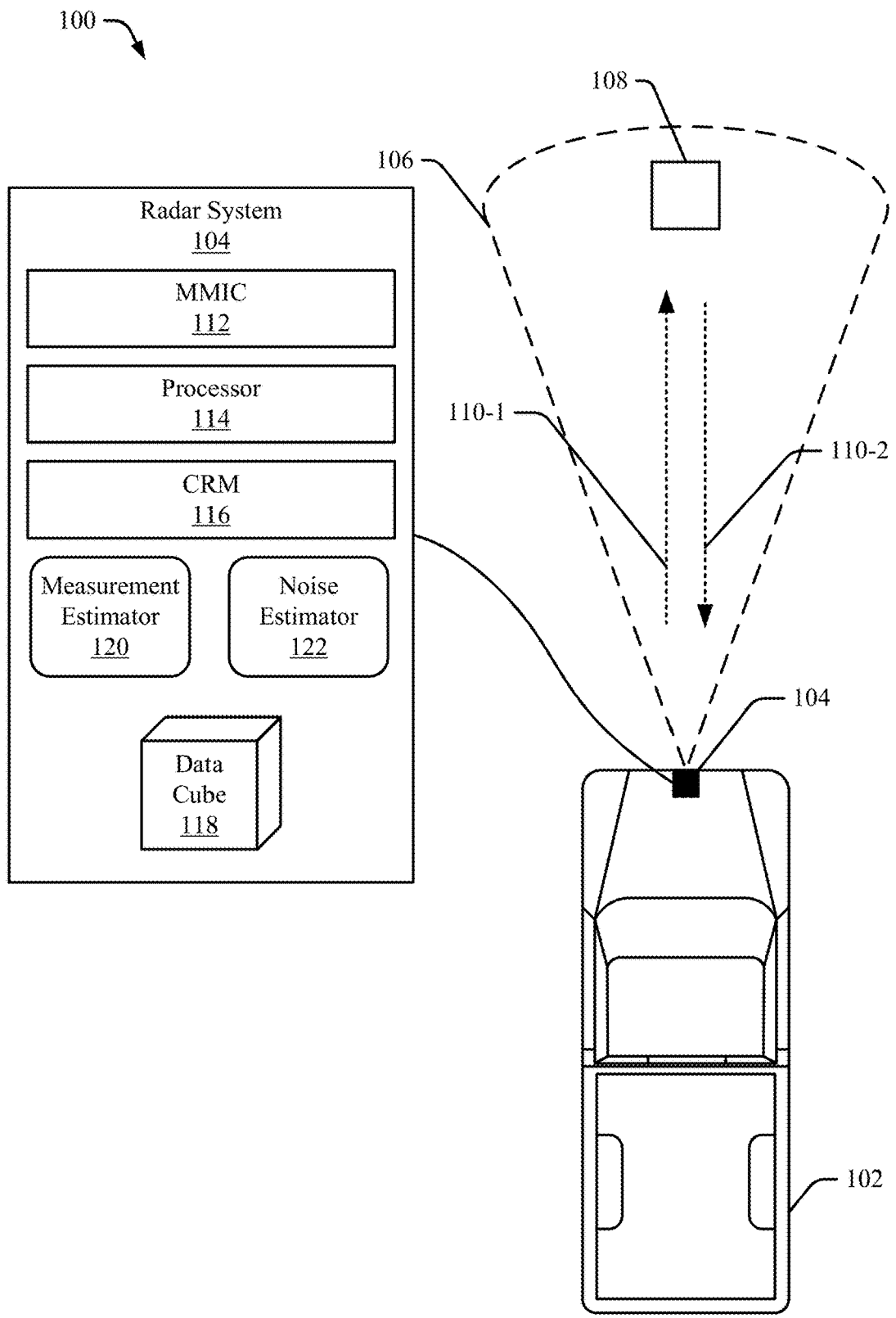
FIG. 1 illustrates a conceptual diagram of an example environment for performing OSR CFAR detection with empirical data fitting, in accordance with the described techniques.

A vehicle may include a radar system, which uses a Multiple Input Multiple Output (MIMO) antenna array to generate a data cube containing radar results derived from sampling multiple radar chirps across multiple channels during each frame. Cells of the data cube may be individually addressable using a row and column identifier for that particular cell. For each look period or frame, a data cube is maintained in memory such that each cell is individually addressable using a unique combination of parameters including range bin, chirp identity, and channel.

During range processing, range Fast Fourier Transform (FFT) results for successive chirps are written to the memory to fill cells of the data cube (e.g., an entire row of cells in the data cube). For example, non-coherently integrated (NCI) data from across the antenna array is written along a single Doppler axis of the data cube. Whereas, during Doppler processing, the range FFT results from successive ranges of cells (e.g., an entire column of data cube cells) is read from the memory, and this NCI data is integrated across each Doppler axis to generate a mapping of potential radar detections across all cells of the data cube.

Analysis of the data cube following Doppler processing enables identification of radar detections (e.g., using energy peak finding). A vehicle may execute radar based functions (e.g., advanced safety maneuvering, semi/fully automated driving, occupant safety monitoring), which depend on immediate and precise reporting of radar detections. For instance, detections can be used to derive measurements of objects. Care is taken not to report false detections (e.g., detections of objects that do not exist), or to report false detections as infrequently as possible. If false detections are misreported to be valid, performance of these functions may diminish.

A false alarm rate (FAR) is a performance metric indicative of a radar's ability to prevent false alarms and correctly report valid detections and not report false detections attributable to noise. A valid detection may be derived from an individual cell or multiple cells of a data cube, which includes many other cells associated with this ambient noise. Ambient noise constantly changes across chirps, channels, and frames, and can include uncorrelated thermal noise, correlated phase noise, or a combination thereof. A well-tuned radar can provide a low (e.g., approaching zero) CFAR even if operating conditions and noise conditions quickly change.

A noise threshold is often used to maintain a low CFAR by separating valid detections from false detections caused by noise; the threshold establishes a noise floor for allowing a detection to be reported or used in further analysis. Establishing this threshold can be a challenge because noise behavior can change frequently and/or unpredictably. False detections can be misreported as valid detections when true ambient noise exceeds a noise threshold that is set too low. If incorrectly set too high (e.g., above true ambient noise power), the noise threshold can mask valid detections that are otherwise derivable from low power radar returns. By adjusting the noise threshold to correctly account for frequent and unpredictable changes in noise behavior, a radar can operate with a low, CFAR in its reported detections.

Existing CFAR Detection

A CFAR detector can be used to adaptively set ambient noise thresholds to appropriate levels by accounting for expected noise behavior encountered under varying operating conditions. Accuracy in radar data is improved when the CFAR detector consistently adjusts the noise floor appropriately, including to account for variations in noise behavior caused by internal and external sources, which can vary at each cell of the data cube. The adjustments can be derived by noise models, which apply a set of assumptions that may apply for most (but not all) situations, to estimate noise behavior generally during any operating conditions. For example, if noise is modeled as a zero-mean Gaussian (or Normal) distributed random variable with unknown variance in signal strength, a CFAR detection scheme can provide a constant false alarm rate against any possible noise having the unknown noise variance. When applied to analyzing cells of a data cube, the model can quickly determine noise floor adjustments that prevent false detections from appearing in a radar output, even as ambient noise power characteristics change. By anticipating adjustments to the noise threshold, a CFAR detector can enable a radar to report valid detections more often by accurately filtering out false detections caused by ambient noise.

Due to their simplicity and robustness, two of the most common CFAR processing techniques include Cell-Averaging CFAR and Ordered-Statistics CFAR. In both Cell-Averaging CFAR and Ordered-Statistic CFAR, a radar system checks for the presence of actual targets by adjusting a noise threshold applied to a target cell based on noise power estimates taken from neighboring (e.g., leading and lagging) cells, which are input to a noise model. Correctly selecting the proper neighbor cells to consider can greatly improve the performance of each of these CFAR techniques. It may be challenging to make a correct selection given the wide variation in driving conditions and sources of ambient noise in an environment.

Cell-Averaging CFAR sets a detection threshold for the target cell based on an average (e.g., mean) of power estimates (or a factor thereof) of the neighboring cells. Cell-Averaging CFAR can have accurate and stable performance, however, when neighbor samples are influenced by target and/or clutter returns, this influence can inaccurately bias the averaging calculation and adjustment out of the model. Ordered-Statistic CFAR improves on Cell-Averaging CFAR to address various target scenarios, also through analyzing power from neighboring cells being input to a noise model. However, rather than consider a mean power of neighboring cells, each neighboring cell (or range-bin) is a ranking (e.g., an order) according to a magnitude of their power (e.g., a statistic). One Doppler bin or angle bin with a high power (not necessarily the highest power) is selected to be used in basing a noise model to determine the noise threshold for a cell.

In applying either of these CFAR detection schemes, and others like them, noise data in cells that neighbor a target cell are fit to a noise distribution model, such as a Rayleigh distribution model, to estimate ambient noise expected in those conditions for setting a noise threshold for that target cell. With a suitable noise distribution curve (e.g., adjusted by a scale parameter) applied by the distribution model, a CFAR threshold for that cell can be determined along the curve. For example, a quantile function of the noise distribution model applied to a target cell provides the CFAR threshold to use for that target cell. If a target cell exceeds a noise threshold, then that cell records a target detection. Otherwise, the target cell is deemed to be a false detection and may be ignored and treated as noise.

A problem with existing CFAR detectors that adopt variations of Cell-Averaging CFAR and Ordered-Statistics CFAR, is their focus on estimating a single parameter (e.g., the scale parameter, a CFAR multiplier) to fit a noise distribution, which is often varying by more than just this single parameter, for instance, ignoring variations in shape of the noise distribution. For example, a scale parameter (commonly called a) can be estimated for adapting a Rayleigh distribution model that is applied to estimating the noise floor of a target cell. A row or column of a data cube input as a data vector into a model. For example, the NCI data obtained from across the antenna array is fed through a processor along a Doppler axis of the data cube. For each position in the data vector, a certain number of neighboring cells are used to estimate some type of statistic. This statistic could be a mean, a median, a particular ordered statistic, or some other value. This value is then multiplied by a CFAR multiplier, which essentially scales the estimated statistic so that the resulting data product can serve as a CFAR threshold relative to the noise or clutter.

For example, using techniques by Weber and Haykin, specific ordered-statistics are extracted, and a distribution of noise or clutter to be rejected is determined from applying a threshold given by $X_i^\alpha X_j^{1-\alpha}$, where $X_i$ and $X_j$ are two of the ordered-statistics extracted from elements i and j of the data, and a is a scalar value, which depends on the desired false alarm rate. The CFAR threshold is computed as $$f\left(\frac{X_i}{X_j}\right) * X_i,$$

where $f(\cdot)$ denotes a non-linear function (e.g., a third order polynomial function). The nature and coefficients of the non-linear function are determined by a numerical fitting procedure between a ratio of the extracted ordered-statistics and the required CFAR multiplier for a particular noise distribution. In another example, using techniques by Drumheller and Lew, a ratio of ordered-statistics is used as an input to select a non-linear function for determining the CFAR threshold in cases where noise is necessarily represented by Gamma distributed random variables. The proper non-linear function is found through numerical techniques based on an assumption of the Gamma distributed random variable. Each of these techniques are inaccurate in cases where ambient noise follows a different distribution than the particular distribution (e.g., Gamma distribution) assumed by the model. A radar equipped vehicle may drive in an open street at one time, and then quickly switch to driving on a highway with a guardrail on one or both sides. However, neither an Ordered-Statistics CFAR distribution model or a Cell-Averaging CFAR distribution model can correctly model noise in both situations correctly; instead, each may be better in one situation than the other.

Ambient noise often follows different patterns than a noise distribution that is modeled, especially a modeled distribution that is adjusted based primarily on a single signal characteristic (e.g., power). As such, traditional Ordered-Statistics and Cell-Averaging CFAR distribution models may incorrectly estimate ambient noise, which can behave differently in multiple ways (e.g., power and shape) when observed across different scenarios. Using an incorrect non-linear function for ambient noise modeling can lead to inaccurate CFAR thresholding. Deriving a noise distribution using existing techniques that focus on choosing a non-linear function based on signal strength alone, may not adequately reflect a change in shape of the noise distribution, and a CFAR threshold determined from the chosen non-linear function may not be valid. Using over-simplified models, which are adjustable given a single parameter, can reduce latency or implementation costs, however, this may cause CFAR detectors to improperly adjust a noise threshold for many situations, except when ambient noise happens to follow the noise distribution adopted by the model.

Driving environments for vehicle radars continue to evolve over time; ambient noise may become even more attenuated and unpredictable in future driving situations, as more radar and other sophisticated equipment is deployed on vehicles and infrastructure to support driving. Existing CFAR detectors can have difficulty maintaining a low CFAR in frequent situations, in which noise behaves different than expectations of the model. It may be become even more challenging to select appropriate neighbor cells or estimate a correct scaling parameter to accommodate unpredictable fluctuations in ambient noise. Existing CFAR detectors may execute multiple models (increasing complexity) and/or have high CFAR for common situations either overlooked or not carefully considered by their model(s). A single model CFAR detector that works in any situation is desired, especially on vehicles or other applications where improved performance of radar based functions can lead to an increase in comfort and/or safety.

Overview of Osr Cfar Detection with Empirical Data Fitting

In contrast to existing CFAR detection processes, techniques are described for implementing a noise model using OSR CFAR detection with empirical data fitting. It will be made clear that performing OSR CFAR detection with empirical data fitting can, with little added complexity, improve CFAR detection performance relative to traditional Ordered-Statistics CFAR, Cell-Averaging CFAR, or other CFAR techniques. For ease of description, OSR CFAR detection with empirical data fitting techniques are described specifically in the context of performing CFAR detection in a fast-chirp linear frequency modulated (LFM) radars, where ambient noise is prevalent, and which can arise in Non-Coherently Integrated (NCI) data obtained from sampling across the antenna array, including uncorrelated thermal noise and correlated phase noise. However, the OSR CFAR detection with empirical data fitting techniques may be adapted to apply to other radar schemes besides just fast-chirp LFM. The techniques may further be adapted to apply to other forms of radar data, which is not NCI data, but rather radar data obtained at other stages of a radar processing pipeline.

In obtaining NCI data of an environment, consider a radar system that includes a MIMO antenna array, a processor, a millimeter microwave integrated circuit (MMIC), and other hardware. One specific source of ambient noise is readily observed in fast-chirp LFM radar systems; strong reflections from distant targets can lead to a phase noise component, which is correlated across the antenna array. This, combined with thermal noise (e.g., commonly modeled as Gaussian distributed), causes the ambient noise distributions in fast-chirp LFM environments to be complex. Data obtained across the MIMO antenna array is combined through non-coherent integration and used to fill data for a data cube (e.g., in advance of detection processing). Because of the complex ambient noise including this fast-chirp LFM phase noise, NCI data used to fill the data cube may indicate a resulting noise distribution in phase components that is quite diverse among different cells or bins. Furthermore, the angle of arrival and angle of departure for a received signal, as well as a strength (e.g., signal power) of the received signal can change the way the fast-chirp LFM phase noise and thermal noise mix, leading to greater diversity of noise distributions. To combat this noise arriving from mixed sources, the radar system executes (e.g., on one or more hardware units of the radar system) an OSR CFAR detector is described, which adopts a single noise model configured to apply empirical data fitting to keep a CFAR at a consistently low level, across a wide range of operating conditions.

An OSR CFAR detector with empirical data fitting can solve a problem of inexact representation of noise by avoiding a fully parametric description of the noise. Instead, of using a single numerical approach to define a noise distribution model, an empirical approach is used to characterize how an OSR maps to an appropriate CFAR multiplier, so as to provide a controlled false alarm rate against a variety of different noise distributions. Multiple (e.g., at least two) ordered-statistics are extracted from the NCI data, which are then used identify an OSR for mapping to an appropriate CFAR multiplier and quantile function for a distribution at hand. The OSR indicates a degree of skewness of the noise among the analyzed cells. A more accurate CFAR threshold can be identified using an empirical approach to predefine a correct mapping between expected OSR values and a CFAR multiplier/quality function for any noise distribution. Empirical data fitting applies an OSR computation to determine expected OSR values based on an evaluation of a radar under test conditions. From evaluating the expected OSR values derived from multiple test frames, a mapping between an OSR and an appropriate CFAR multiplier is derived. The final CFAR threshold used to perform further processing on the data cube is determined based on selecting and multiplying one of the two ordered statistics, with the appropriate CFAR multiplier. Because of an empirical data fitting process executed prior, a radar system can apply this mapping to account for shape shifts or other variations in a noise distribution beyond just fluctuations in noise strength.

Example Environment

FIG. 1 illustrates a conceptual diagram of an example environment for performing OSR CFAR detection with empirical data fitting, in accordance with the described techniques. Depicted is an environment 100, which includes a vehicle 102 equipped with an onboard, radar system 104. The radar system 104 enables other systems of the vehicle 102 (not shown for simplicity in the drawings) to detect an object 108, which can impact how or whether the vehicle 102 can continue to travel. The depicted environment 100 includes the vehicle 102 traveling on a roadway. Although illustrated as a passenger truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like.

The radar system 104 has a region of interest associated with the radar system 104, which at least partially surrounds the vehicle 102. This region of interest is referred to as a field of view 106 (also referred to as an instrumented field of view). The radar system 104 can transmit radar signals 110-1 into the field of view 106 and process radar returns 110-2 that reflect back from the environment 100 to determine the position, angle, range-rate, or other characteristics of the object 108 relative a position and orientation of the vehicle 102. Careful selection and/or positioning of components of the radar system 104 may cause the field of view 106 to have a particular shape or size. Components of the radar system 104 can be installed on, mounted to, or integrated with any part of the vehicle 102, such as in a front, back, top, bottom, or side portion of the vehicle 102, a bumper, a side mirror, part of a headlight and/or taillight, or at any other interior or exterior location of the vehicle 102.

As previously suggested, the vehicle 102 includes other vehicle systems that are operatively and/or communicatively coupled to the radar system 104 using wired and/or wireless links that act as interconnections, paths, or busses for vehicle inter-component communications. These other vehicle systems use outputs from the radar system 104 to perform vehicle-based functions, which in addition to other functions may include functions for vehicle control. Any conceivable device, apparatus, assembly, module, component, subsystem, routine, circuit, processor, controller, or the like, can be configured as a vehicle system that uses radar data to act on behalf of the vehicle 102. As some non-limiting examples, the other vehicle systems may include a system for autonomous control, a system for safety, a system for localization, a system for vehicle-to-vehicle communication, a system for use as an occupant interface, and a system for use as a radar or multi-sensor tracker.

The radar system 104 includes a monolithic microwave integrated circuit (MMIC) 112, a processor 114, and a computer-readable media (CRM) 116. Other radar components may be used by the radar system 104. Through the MMIC 112, the processor 114 is operatively coupled to an interface of an antenna array (not shown), such as a multiple-input-multiple-output (MIMO) array capable of transmitting multiple chirps across a range of frequencies, on multiple channels. The MMIC 112, the processor 114, and/or the CRM 116 may be operatively and/or communicatively coupled via wired or wireless links (not shown), and may be part of a radar chip, which may be referred to as a system on chip.

The MMIC 112 accumulates radar data from the MIMO array on behalf of the processor 114. The radar data includes information about the position and movement of objects in the field of view 106, such as positions and range-rates of radar detections that reflect off the object 108. The MIMIC 112 receives instructions from the processor 114 to indicate characteristics (e.g., timing, phase, frequency range, channels) of the radar signals 110-1 and their corresponding reflections, i.e., the radar returns 110-2. The MMIC 112 causes the radar signals 110-1 to be transmitted via the MIMO array and into the environment 100 and then, causes the radar returns 110-2 to be detected and received.

The processor 114 processes the radar data generated by the MMIC 112, and outputs the processed radar data into a data structure (e.g., one-dimensional array; multiple-dimension array) usable by the other vehicle systems of the vehicle 102. A data cube 118 is an example of processed radar data generated by the processor 114 from radar data obtained by the MMIC 112. Any single or multiple dimension data structure can be used; the data cube 118 is only one example of a suitable format for conveying information about the radar returns 110-2, for performing OSR CFAR techniques.

The processor 114 may include a hardware accelerator, a controller, a control circuit, a microprocessor, its own chip, its own system, its own system-on-chip, a device, a processing unit, a digital signal processing unit, a graphics processing unit, or a central processing unit. The processor 114 may include multiple processors or cores, embedded memory storing executable software or firmware, internal/dedicated/secure cache or any other computer element that enables the processor 114 to execute machine-readable instructions for generating radar outputs. In some examples, the processor 114 and at least a portion of the CRM 116 are a single component, such as an embedded system or system on chip.

At least a portion of the CRM 116 is configured as a dedicated storage for the processor 114. The CRM 116 may include regions of storage (e.g., memory) reserved by the processor 114 to maintain the data cube 118 during radar processing. Access to the CRM 116 may be shared by other components of the radar system 104. The CRM 116 may also store machine-readable instructions for executing radar operations. As two examples, the CRM 116 stores instructions for executing radar functions performed by a measurement estimator 120 and a noise estimator 122 to generate the data cube 118.

The measurement estimator 120 is configured to estimate and store values for detections, including range, Doppler, and/or angle. It should be understood that OSR CFAR techniques with empirical data fitting can be applied to the radar system 104 regardless of whether the measurement estimator 120 can estimate just one of range, Doppler, and angle, whether the measurement estimator can determine two of range, Doppler, and angle, or whether all three of range, Doppler, and angle can be estimated. With these measurements, the data cube 118 and information derived therefrom (e.g., radar tracks to objects) can be used to enable advanced safety or autonomous driving functions that avoid obstacles at positions and velocities inferred from the data cube 118. Information, including the data cube 118, can be communicated within the radar system 104 to enable other functions of other radar system (e.g., object classifying, object tracking), which for simplicity of the drawings are not shown in FIG. 1. It is also possible that other systems of the vehicle 102 and/or other vehicles and external systems receive information from the radar system 104 (e.g., using vehicle to everything communication networks), including the data cube 118, to enable safe driving by these other vehicles, as well.

The noise estimator 122 is configured to filter noise from the data cube 118 to improve its accuracy and eliminate false alarm detections. The noise estimator 122 can execute on behalf of the measurement estimator 120, or as a pre-processing or post-processing step. Noise associated with the data cube 118 can be filtered from the data cube 118 at different times in the processing pipeline of the radar system 104. The noise estimator 122 can precede or follow execution of the measurement estimator 122. The noise estimator 122 can estimate noise at different stages of the measurement estimator 122; this includes determining the noise either before, after, or while the measurement estimator 122 performs range processing, Doppler processing, and/or angle estimating. Executing the noise estimator 122 earlier may improve throughput of the radar system 104 because the measurement estimator 122 can avoid wasting processing resources (e.g., cycle time of the processor 114, storage capacity of the CRM 116) and refrain from estimating Doppler, or angle for detections that are likely attributed to noise.

For ease of description, the following examples describe OSR CFAR detection techniques that occur after range processing, but prior to Doppler processing and/or angle estimating. That is, the noise estimator 122 can act on the data cube 118 after range processing about the radar returns 110-2, before Doppler processing and/or peak detection analysis occurs. The CFAR thresholding check performed by the noise estimator 122 can occur after Doppler processing and angle estimating using the data cube 118 in the post-Doppler processing domains. NCI data can be computed over the virtual channels of the antenna array, after coherent Doppler processing.

Example Noise Estimator

Figure 2:
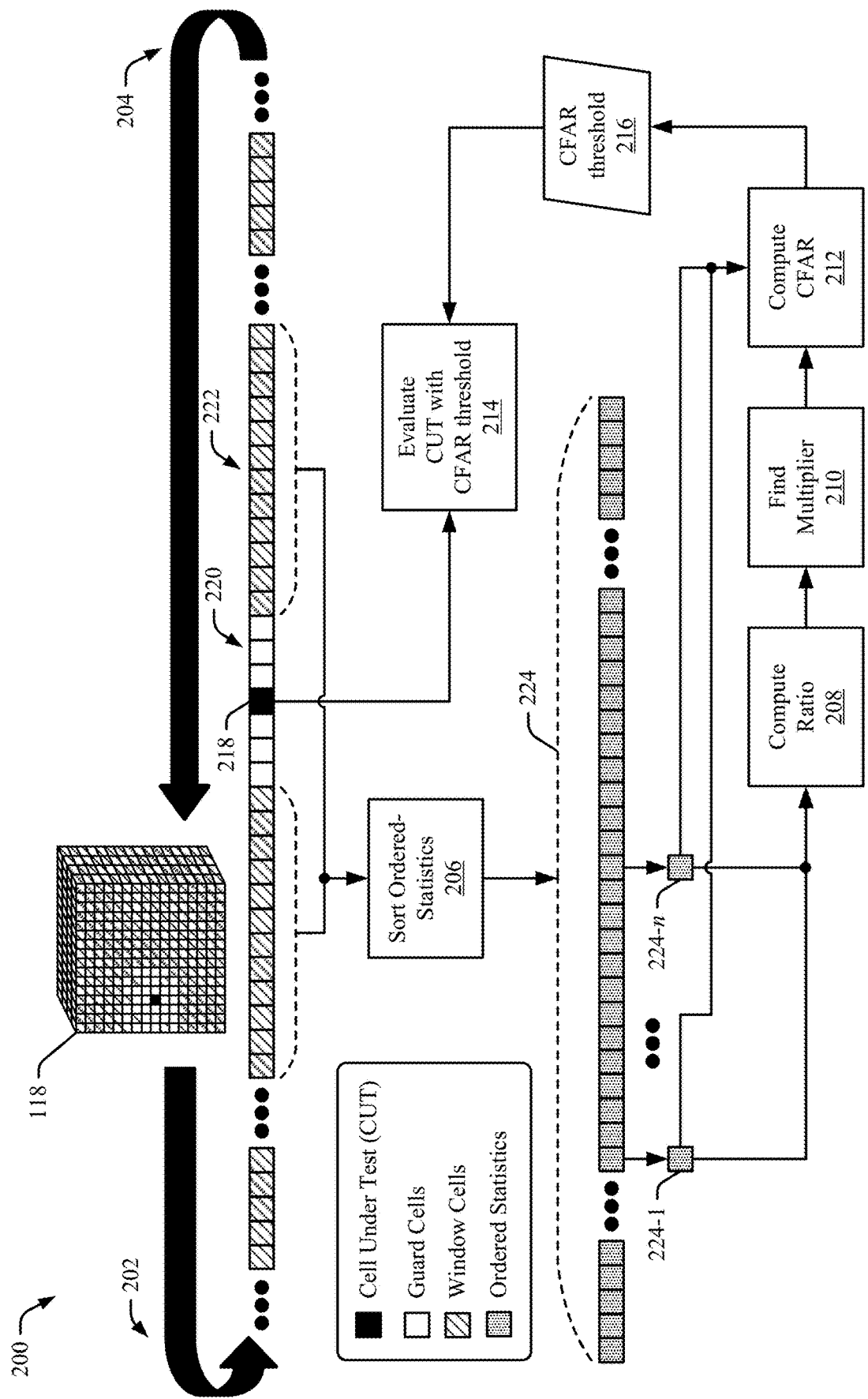
FIG. 2 illustrates a conceptual diagram of an example noise estimator and measurement estimator for a radar system configured to perform OSR CFAR detection with empirical data fitting, in accordance with the described techniques.

FIG. 2 illustrates a conceptual diagram of an example noise estimator 200 for a radar system configured to perform OSR CFAR detection with empirical data fitting, in accordance with the described techniques. For example, the noise estimator is an example of the noise estimator 122. The noise estimator 200 obtains the data cube 118 as an input, which in some cases includes accessing the data cube 118 from a memory.

The noise estimator 200 may independently evaluate each cell of the data cube 118 against an appropriate measure for ambient noise, which is chosen specifically for that cell or range bin containing the cell. In response to receiving an indication of the generation of the data cube 118, the noise estimator 200 is configured to extract a sample vector 202 of original information from the data cube 118, for instance, by reading a sequential group of cells from an entire row of the data cube 118. The noise estimator 200 is configured to provide an output vector 204 of new information for the data cube 118, which can overwrite least some of the original information, to filter cells of the data cube 118 from complex influences of noise.

In the example shown in FIG. 2, the noise estimator 200 divides the OSR CFAR check into five stages of operations, shown as a sort ordered statistic stage 206, a compute ratio stage 208, a find multiplier stage 210, a compute CFAR stage 212, and an evaluate stage 214. In other examples, the noise estimator 200 can include additional or fewer stages, which can perform similar operations as the stages 206 to 214. A CFAR threshold 216 is individually computed for each cell under test (CUT) 218, which is processed from the sample vector 202.

At the sort ordered statistic stage 206, a sequential group of cells is obtained from the sample vector 202, and the CUT 218 is identified from the sequential group. The CUT 218 is surrounded by a plurality of guard cells 220 (e.g., prior and/or subsequent cells within the sequential group relative the CUT 218). A plurality of window cells 222 is isolated from the CUT 218 and the guard cells 220. Information from the guard cells 220 and the CUT 218 is set aside and information from the window cells 222 alone, is used to estimate multiple ordered statistics 224 for the CUT 218. The ordered statistics 224 are ranked, which enables their efficient consideration in other stages of the noise estimator 200.

At the compute ratio stage 208, based on the multiple ordered statistics estimated from the window cells 222, the noise estimator 200 determines an OSR for the CUT 218. For example, at least two ordered-statistics 224-1 and 224-$n$, which are referred to as $X_i$ and $X_j$, respectively, are extracted from among the sorted ordered statistics 224. A ratio between the extracted ordered statistics is computed and used as the OSR for the CUT 218.

In the find multiplier stage 210, the OSR determined in the compute ratio stage 208 is used to determine a CFAR multiplier. For example, the find multiplier stage 210 may evaluate a look up table (LUT) or perform other techniques to map the OSR to a proper value for the CFAR multiplier. The find multiplier stage 210 relies on empirical data fitting, as described below, for example, in the description of FIG. 3-1.

A noise model adopted by the noise estimator 200 can be represented by Equation 1:

$$e^{j\phi_k}\Phi[n]\sum_{m=1}^{M}c_m[n]e^{j\psi_m} + e[k, n]. \qquad \text{Equation 1}$$

Equation 1 applies only to the slow-time (or chirp to chirp) version of the data cube 118, which is determined prior to Doppler processing and/or angle estimating. Ambient noise is represented in Equation 1 as a combination of thermal noise and phase noise, again, explicitly in the slow-time (or chirp-to-chirp) domain. This model is meant to represent mixing of phase noise, which is common across transmit and receive channels, and thermal noise, which is independent from receive channel to receive channel.

In this model, k is a receive channel index, m is a transmit channel index, $\phi_k$ is a receive channel phase, and $\psi_k$ is a transmit channel phase. Further, $\Phi[n]$ is a phase noise random variable, such as a complex Gaussian with zero-mean and variance $\sigma_\Phi^2$, which is independent, and identically distributed from chirp to chirp. A MIMO code sample for transmitter mat chirp n is given by $c_m[n]$. The term e[k, n] is thermal noise on receive channel k, and at chirp n, which can be a complex Gaussian with zero-mean and variance $\sigma_e^2$, which is independent, and identically distributed in both k and n domains. The phasing terms $\phi_k$ and $\Psi_m$ arise from the fact that the phase noise signal is multiplicative with the received signal from a particular target, and hence the phase noise sequence is modulated with the angle of arrival phase on transmit and receive of the target which generated it. The phase noise is further modulated along with the MIMO codes used to distinguish the emissions for the transmitters in the MIMO array. The phase noise variance $\sigma_{\Phi}^2$ depends on the strength of the reflection from the target, whereas the thermal noise variance $\sigma_e^2$ depends on receiver baseband filtering and the receiver noise figure.

As mentioned, the noise model defined by Equation 1 applies only to the slow-time (or chirp to chirp) data cube 118, which is determined prior to at least one of Doppler processing and/or angle estimating. Target detections, however, are inferred from the data cube 118 after it has undergone Doppler processing and is non-coherently integrated across the antenna array (or across the m and k dimensions). The noise estimator 200 may apply a transformation to the data cube 118 prior to evaluating the CFAR threshold 216 with the CUT 218. For example, if the MIMO coding for the radar system is a code division multiplexing (CDM) approach, then Doppler processing includes first demodulating the above sequence with respect to a particular transmitter's code, which is followed by computing the Doppler discrete Fourier transform.

Then, once the data is appropriately transformed to the Doppler domain, some type of non-coherent integration can be performed across the transmit and receive channel domains. A final distribution used for detection in a noise-only case can change depending on the type of non-coherent integration performed. For example, one approach is to add the linear magnitude of all the channels. Another approach may be to take a maximum linear magnitude across all channels as the NCI data product. In fact, there are a great many options for performing non-coherent integration which have their own benefits and drawbacks in terms of detection performance, computational complexity, and analytical complexity.

As is made clear below, the empirical data fitting applies the noise model of Equation 1. As such, an exact parametric or analytic representation of the probability density function (PDF) of a final NCI data product need not be known under a no target signal condition. Instead, a set of distributions can be empirically fit to data collections with respect to a certain set noise parameters of interest. In particular, an angle of arrival for the target signal which generated the phase noise portion, and a strength of the target signal can be varied over relevant settings. For a given relative strength of phase noise and thermal noise, and for a given signal angle of arrival, data can be collected and fit empirically, such that the final NCI data products in the noise only cases are statistically homogeneous.

At the compute CFAR stage 212, the CFAR threshold 216 is determined for the CUT 218. For example, the CFAR multiplier is used to scale up or scale down one of the ordered statistics extracted in the compute ratio stage 208. The scaled ordered statistic is set as the CFAR threshold 216.

The evaluation stage 214 filters the CUT 218 for noise. The CFAR threshold 216 is applied to the CUT 218, and based on their comparison, information at the CUT 218 is either treated as noise or left untreated. For example, if a signal power associated with the CUT 218 does not satisfy the CFAR threshold 216, information at the CUT 218 is filtered from the data cube 118 (e.g., marking the CUT 218 as being associated with noise, zeroing information associated with the CUT 218 to prevent its use in execution of other radar based operations). If the signal power satisfies the CFAR threshold 216, the CUT 218 is considered to have information from valid returns (e.g., not from noise), which is usable for further processing. Information from filtered cells is omitted or altered when producing the output vector 404, and information from the unfiltered cells is included in the output vector 204, the same as it is in the sample vector 202.

This way, the noise estimator 200 can cause the data cube 118 to be modified to include the information from the output vector 404 in pace of the information from the sample vector 202. The data cube 118 may be more accurate and enable more-efficient radar processing. For example, the data cube 118 can used by the measurement estimator 120 to derive detections and/or object measurements without wasting resources considering information likely influenced by noise. The noise estimator 200 configures the radar system 104 to provide a low CFAR, regardless of noise conditions.

Example Process

Figures 1, 3:
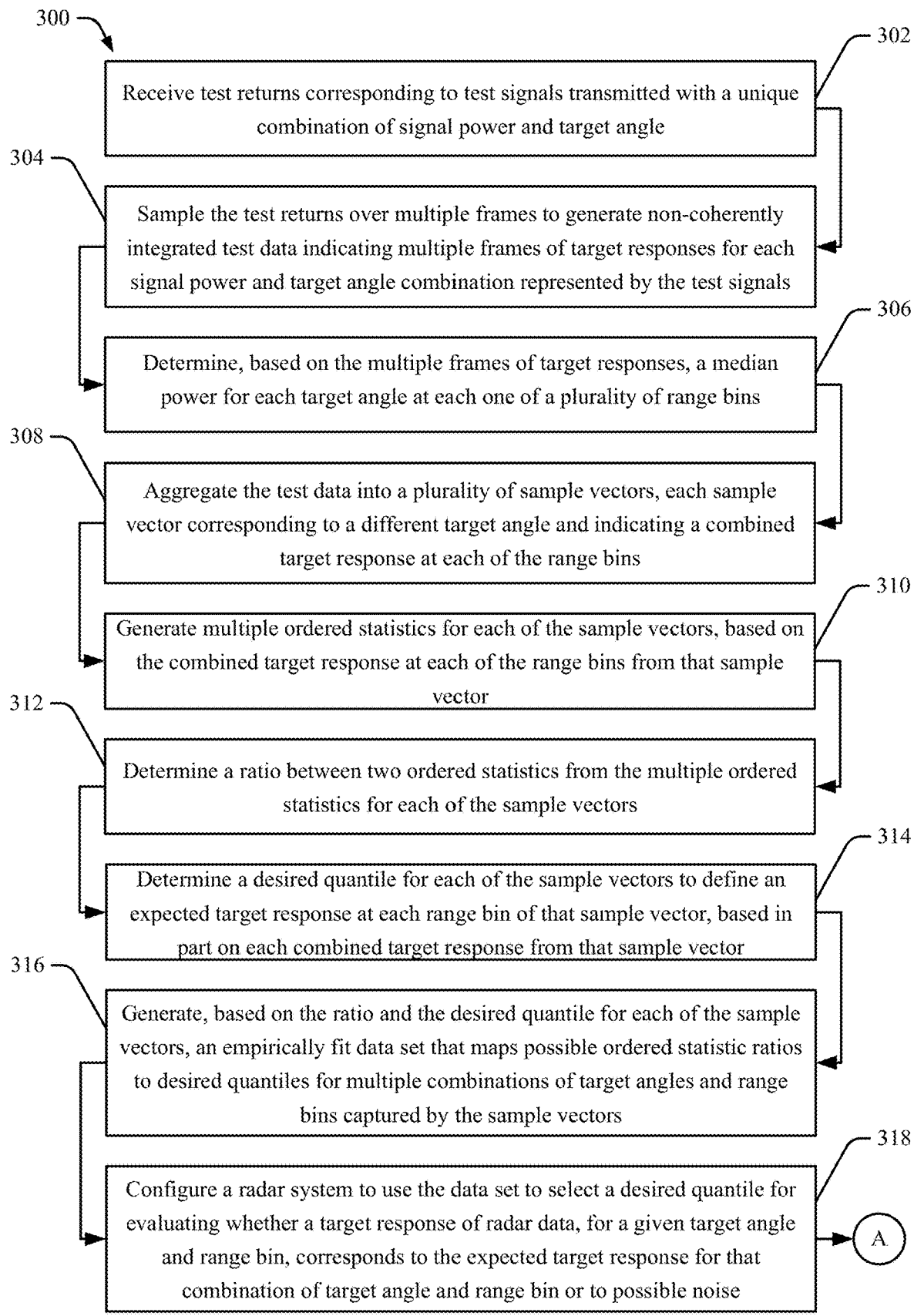
Figures 2, 3:
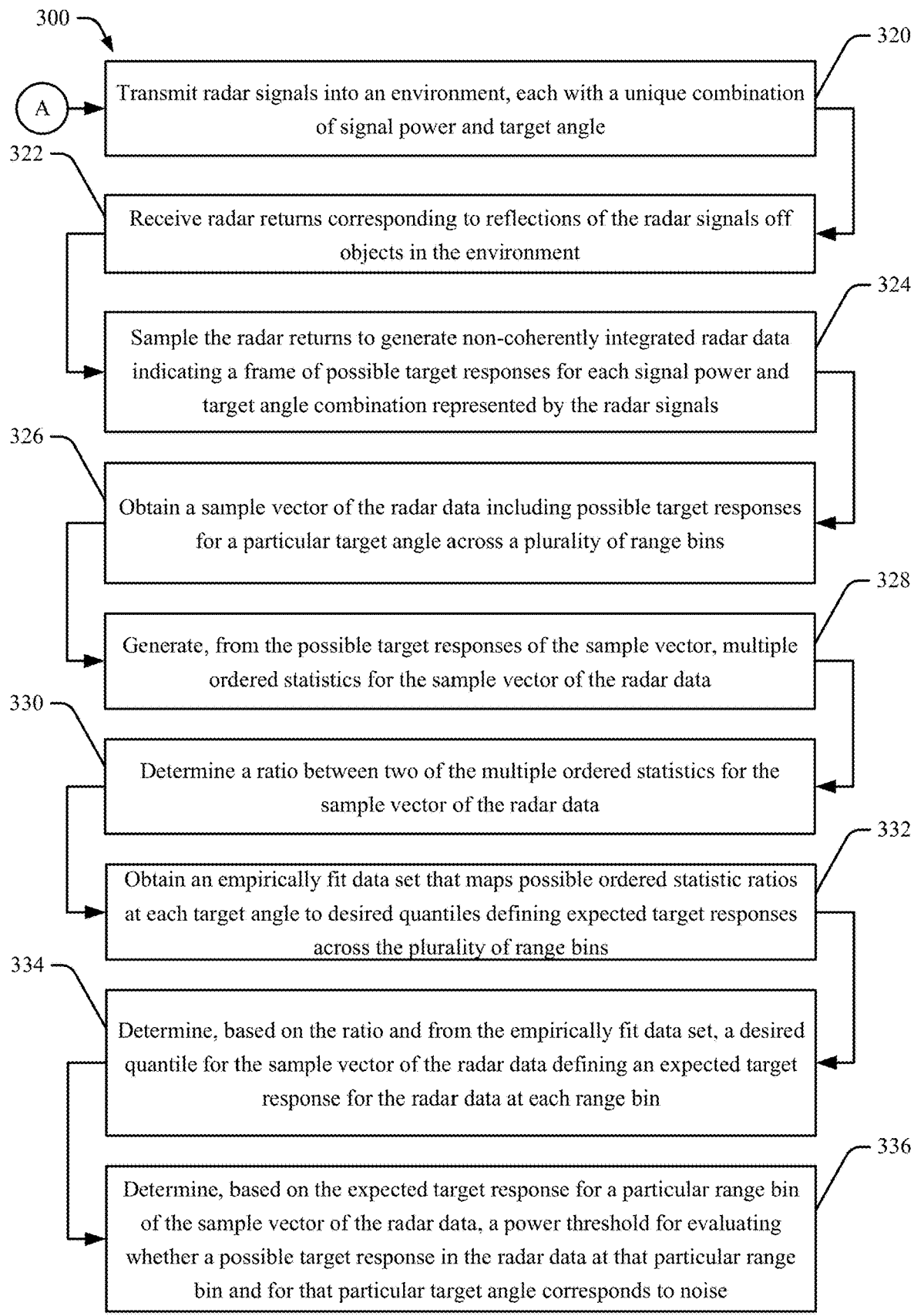

FIGS. 3-1 and 3-2 illustrate a flow diagram of an example process 300 for performing distribution fitting CFAR detection with empirical data fitting, in accordance with the described techniques. Through execution of the process 300, a CFAR threshold of the radar system 104 may accurately adapt to changing noise conditions.

FIG. 3-1 includes a first part of the flow diagram of the process 300, which upon execution, configures a processor (e.g., a computing system, a radar system, a vehicle) to generate empirically fit data for enabling OSR CFAR detection with empirical data fitting. A second part of the flow diagram of the process 300 is shown in FIG. 3-2, which upon execution, configures a radar to perform OSR CFAR detection with empirical data fitting using the information generated in the first part. The two parts of the process 300 are operatively linked (shown conceptually as a circle labeled "A"). The process 300 is one example of using OSR CFAR detection with empirical data fitting. Operations (also referred to as steps) of the process 300 are numbered sequentially from 302 to 336, however, this numbering does not necessarily imply a specific order of operations. The steps 302 to 336 may be rearranged, skipped, repeated, or performed in different ways than the specific ways shown in FIGS. 3-1 and 3-2.

At least one processor of the vehicle 102 (e.g., the processor 114, other radar component, other vehicle processor or electronic control unit) may execute both parts of the process 300, including to generate empirically fit data that is later used on the vehicle 102 to implement OSR CFAR detection. For example, during initialization, the radar system 104, executing either the noise estimator 122 or 200, may execute a calibration routine to perform the first part of the process. Then, during driving, a noise reduction routine of the noise estimators 122 or 200 may execute, which can apply the calibration performed to improve noise reduction in radar data output for detecting objects near the vehicle 102. However, an amount of time and/or complexity involved in generating the empirically fit data may be too much for on vehicle processing components.

It may be advantageous to execute at least some of the process 300 using two or more different processors. For example, the radar system 104 may execute the second part after another component (e.g., on or external to the vehicle 102) executes the first part of the process 300. FIGS. 3-1 and 3-2 are described further in this context. Complexity of the radar system 104 can therefore be reduced by relying on processors of other systems to generate the empirically fit data more quickly, and (mostly) configuring the radar system 104 to need only apply the data.

Part One: Empirically Fit Data Generation Process

Consider a computing system, which is separate from the radar system 104, and which is on or external to the vehicle 102. A processor of the computing system can execute the first part of the process 300 to generate empirically fit data in advance of driving with the vehicle 102. An empirical data fitting function executing on a remote processor (e.g., a computer in a vehicle manufacturing or repair setting, a remote server) may have access to the radar system 104 and/or the vehicle 102 to generate empirically fit data. In other cases, a simulation system (e.g., a design or engineering setting) with access to the radar system 104, or a computer model thereof, can generate empirically fit data. The empirically fit data generated can be loaded or installed as part of a radar initialization or update process. This data can be used to tune or configure the radar system 104 to operate on the vehicle 102 (e.g., when driving) using Ordered-Statistic CFAR detection with empirical data fitting.

At 302, test returns corresponding to a plurality of test signals that reflect from a single target are received. Each of the test signals is transmitted with a unique combination of signal power and target angle such that the test returns are obtained across a wide range of signal power combinations, for each possible target angle. This may ensure radar data derived from the test returns is statistically homogeneous. For example, through actual or simulated testing of the radar system 104 in its operational environment on the vehicle 102, an actual or simulated radar signal to an actual or simulated target is varied (e.g., in target angle and signal power amplitude) to test or simulate the radar system 104 in a variety of operating conditions. At each target angle, multiple test signals 110-1, each of different signal strengths, are transmitted across multiple test frames. Their transmission induces test returns 110-2, which correspond to reflections of the test signals having different signal strengths for a range of target angles.

Figure 4:
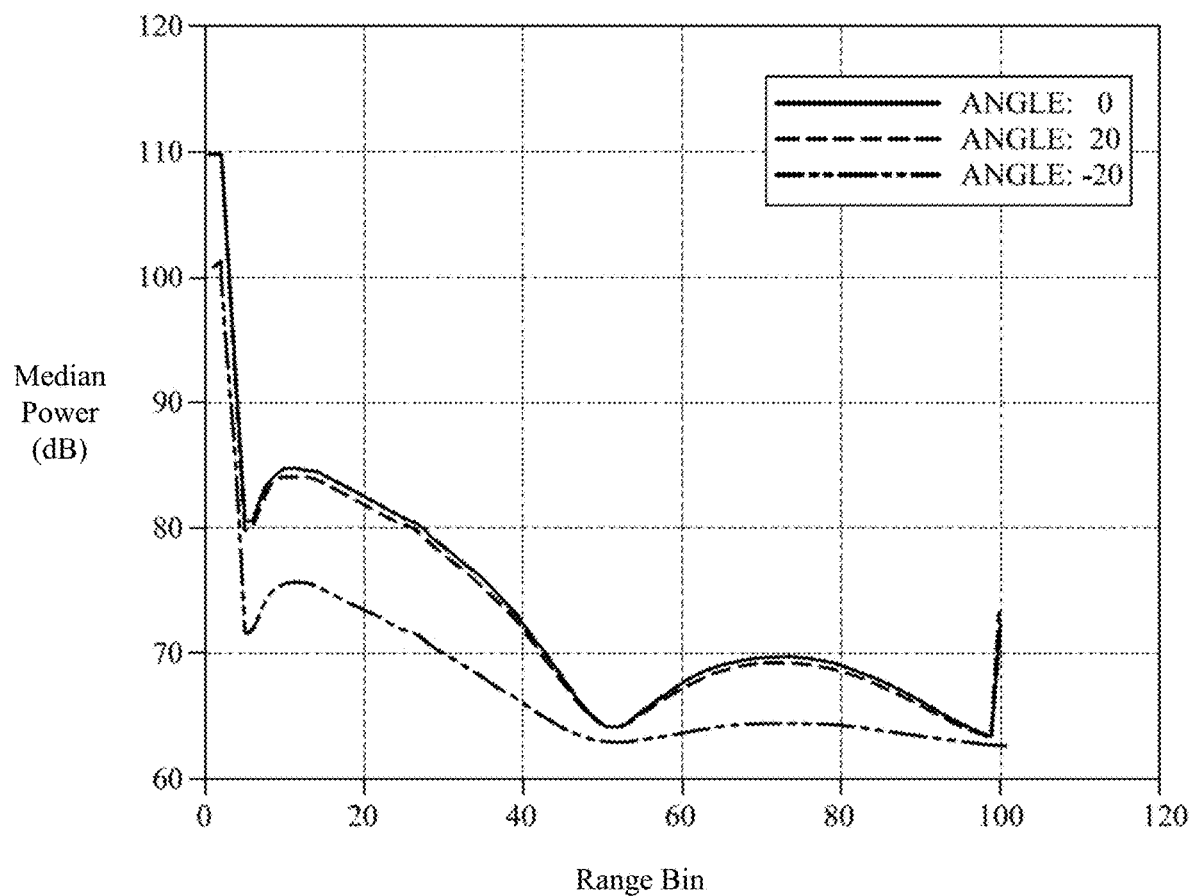
FIG. 4 illustrates a graph of example median power achievable for near target detections.

At 304, the test returns are sampled over multiple test frames to generate non-coherently integrated test data indicating multiple test frames of target responses for each signal power and target angle combination represented by the test signals. As mentioned previously, when radar data, including this test data, is collected non-coherently across a MIMO antenna array, the data has a particular phase noise-to-thermal noise power and a particular set of transmit and receive channel phases, dependent on target angle. For example, FIG. 4 illustrates a graph 400 of example median power achievable for near target detections. The graph 400 conveys median power of NCI data (taken over Doppler and frames) as a function of range bin offset from a strong target (e.g., a target in a range bin index greater than one).

Figure 5:
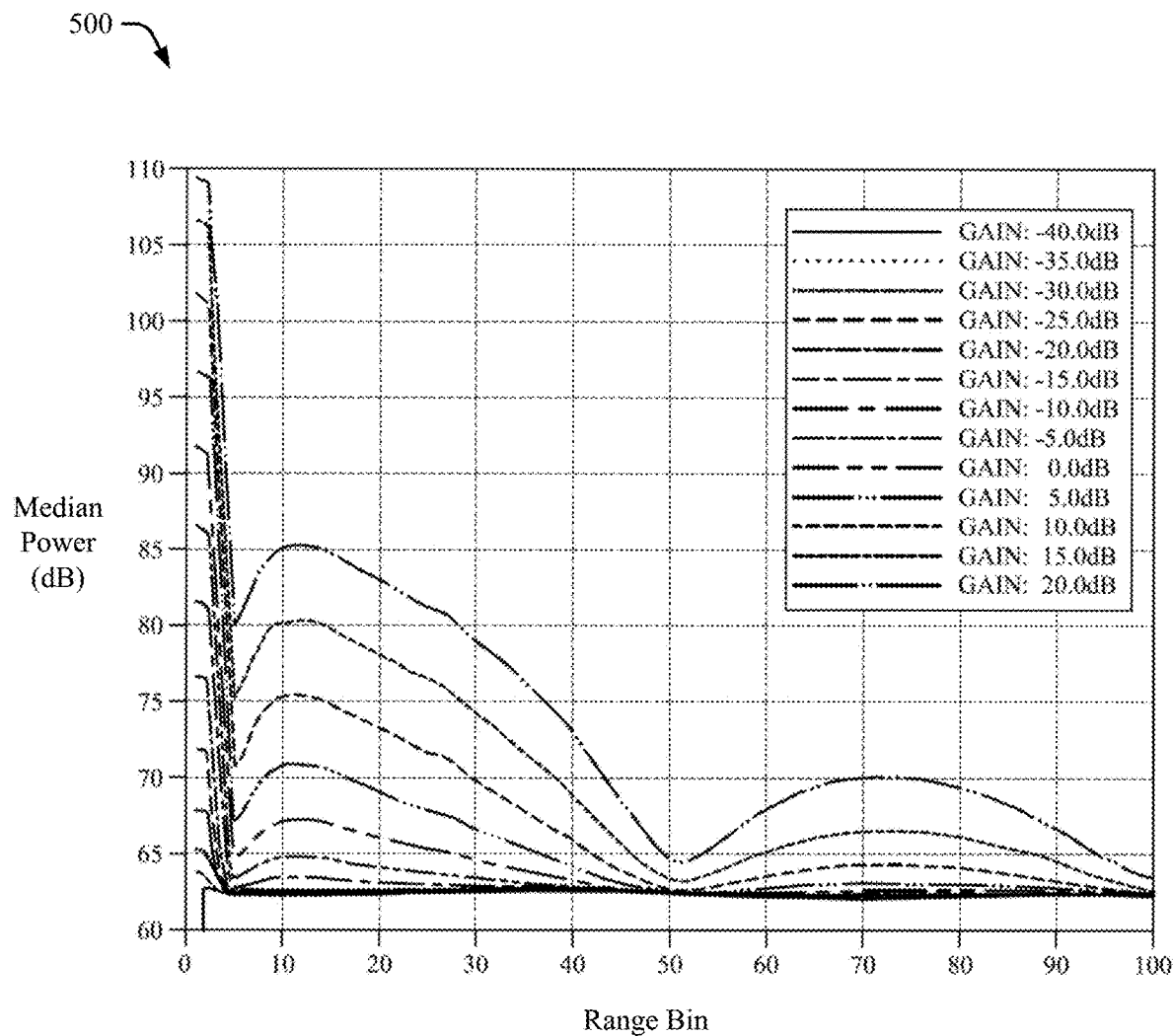
FIG. 5 illustrates a graph of example median power achievable for target detections depending on reflection signal strengths.

To achieve a diversity of phase-noise-to-thermal noise power values in the NCI test data, at each target angle (also referred to as angle of arrival), the signal strength (e.g., signal power) of the test signals can be varied (e.g., from smaller values to larger values) to induce target returns for specific ranges at that target angle. For many target angle and signal power combinations of the test signals, many frames of NCI test data are collected. For example, FIG. 5 illustrates a graph 500 of example median power achievable for target detections depending on reflection signal strengths. The graph 500 conveys median power curves derived from a variety of target signal strengths. The graph 500 plots median power of NCI data as a function of range bin offset from a target at different target signal reflection strengths.

At 306, based on the multiple test frames of target responses, a median power at each one of a plurality of range bins is determined for each target angle. For example, a median power across all target responses on a per range bin basis is computed over the multiple frames for each target angle (e.g., across all Doppler bins). The median power corresponding to each range bin can be computed from averaging signal powers of all target responses for that range bin found across the multiple test frames of the NCI test data for that target angle. The graph 400 displays an example of the impact of phase noise on range bins when a strong target is present. In a no target condition a median power is often much lower (e.g., around 62 dB in general). A strong phase noise raises the apparent total noise floor level and changes the statistical noise distribution. As shown in the graph 400, each target angle includes multiple range bins (e.g., zero, one, two, . . . ) and a corresponding median power.

At 308, the test data is aggregated into a plurality of sample vectors, each sample vector corresponding to a different target angle. For example, range bins with same median power metrics can be combined to form larger groups of statistically homogeneous data at each target angle. This way, larger portions of the test data are defined for different levels of phase noise-to-thermal noise power, which allows for empirical data fitting. These larger aggregated data sets can convey an expected distribution of target responses across all range bins and target angles. This larger pool of homogeneous data allows for accurate numerical estimation of a desired false alarm rate (FAR) quantile. For example, if a FAR quantile of 1 in 1,000,000 ($10^{-6}$) is desired it may be appropriate to have 100 million data points across all range bins and target angles so that an accurate estimate of the FAR quantile (e.g., to one $10^{-6}$) is achieved. In any case, the test data can be divided into several sample vectors (e.g., the sample vector 202), for deriving an empirically defined mapping between each cell under test (e.g., each range bin and angle combination) and its expected target response.

At 310, multiple ordered statistics for each of the sample vectors are generated. The multiple ordered statistics are generated based on the combined target response at each of the range bins from that sample vector. For example, the sample vector 202 can define the corresponding median power determined at step 304 for each range bin of a particular target angle; each element of the sample vector 202 includes a median power for that angle. In this example, this median power represents a single statistic for that target angle. In some cases, the sample vector 202 includes as many statistics as possible range bins for that target angle. In other cases, the sample vector 202 is reduced to fewer groups of statistically homogenous data and include statistics for combinations of range bins for that angle, which are at a same median power level. The statistics of the sample vector 202 may be ranked (e.g., from highest magnitude to lowest magnitude) into the multiple ordered-statistics 224. Each of the ordered-statistics 224 represents of a median power for a different homogenous group of test data for a particular target angle associated with that sample vector 202.

At 312, a ratio between two ordered statistics from the multiple ordered statistics is determined for each of the sample vectors. For example, once the test data is aggregated into sample vectors by median power level and angle, the sample vectors can be processed to determine a proper mapping between ordered statistics being estimated and an appropriate quantile function for CFAR detection. A ratio value may be computed as an average over all the multiple test frames for each particular power level and angle combination. Two or more of the ordered-statistics 224 are compared to compute a ratio for each sample vector, which can be used to estimate a desired FAR quantile function to apply to each homogeneous group (e.g., each element) of the data cube 118 to estimate an expected target response. For example, one of the two ordered statistics from the multiple ordered statistics in the sample vector is selected to determine the ratio for the sample vector by selecting one that is a higher ordered-statistic than the other. This higher ordered statistic may be less than a highest ordered statistic from the multiple ordered statistics in that sample vector. The lowest ordered statistic may be greater than a lowest ordered statistic from the multiple ordered statistics. As one example, a tenth highest and thirtieth highest ordered-statistics may be selected for a sample vector that has thirty-two elements. In some cases, one of the ordered-statistics selected is a median statistic from the multiple ordered statistics. Another of the two ordered statistics from the multiple ordered statistics may be selected to determine the ratio for the sample vector by selecting a higher ordered statistic than the median statistic.

At 314, a desired quantile for each of the sample vectors is determined to define an expected target response at each range bin of that sample vector. The desired quantile for each sample vector determined based in part on each combined target response from that sample vector. For example, the ratios determined at step 312 can be used to as basis for a CFAR multiplier for each phase noise-to-thermal noise power ratio and angle for which data is available. A set of quantile to statistic ratios may be formed by normalizing a desired false alarm rate quantile by a denominator quantile (e.g., a denominator ordered-statistic used to compute an ordered-statistic ratio).

Figure 6:
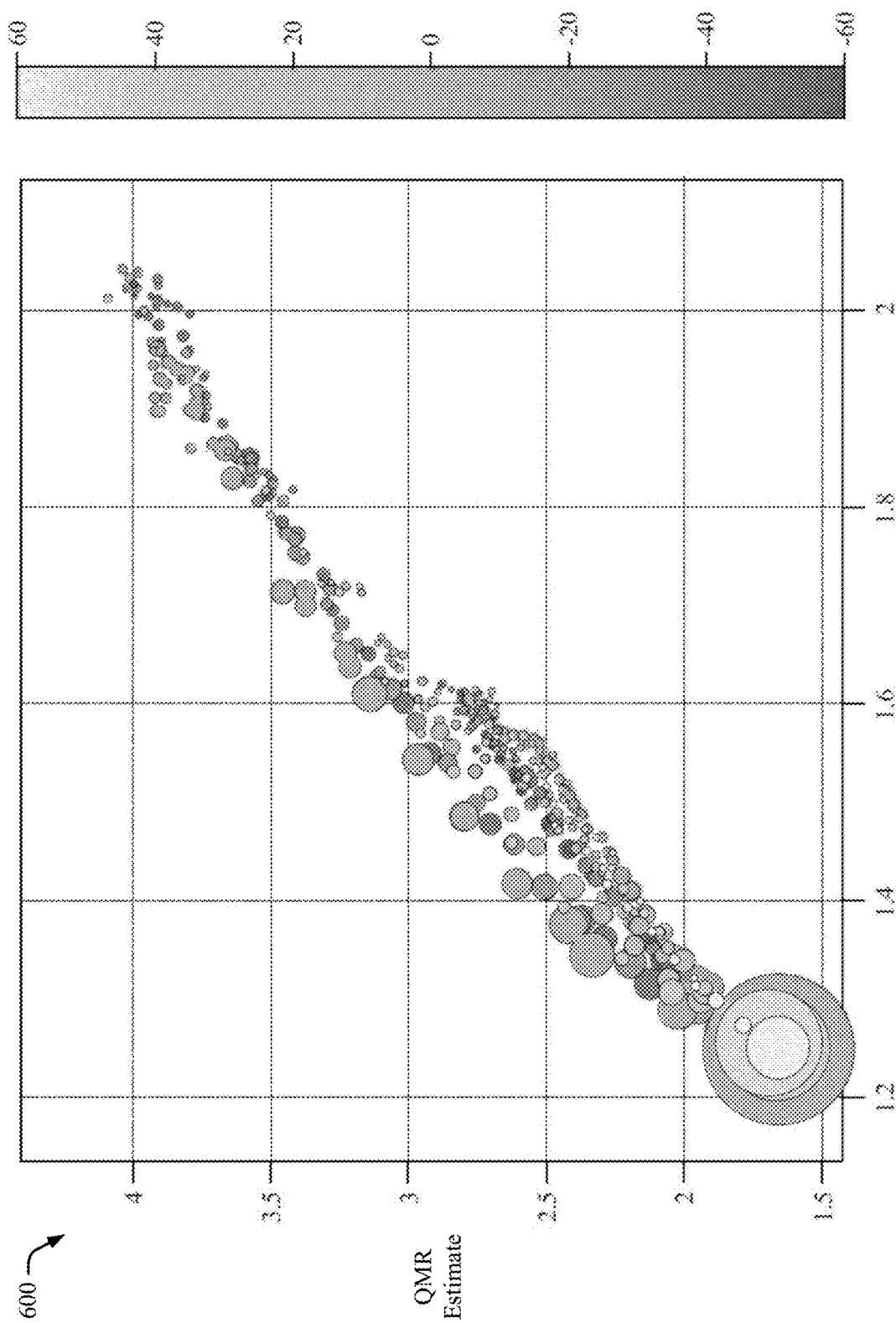
FIG. 6 illustrates a scatter plot distribution of example radar data given estimates of a quantile median ratio (QMR) and estimates of an average OSR, for selecting a CFAR multiplier used during OSR CFAR detection with empirical data fitting, in accordance with the described techniques.

At 316, based on the ratio and the desired quantile for each of the sample vectors, an empirically fit data set is generated that maps possible ordered statistic ratios to desired quantiles for multiple combinations of target angles and range bins captured by the sample vectors. For example, A one-dimensional curve can be fit to ordered-statistic ratios for a particular angle. This resulting curve is a mapping function $f$ between estimated ordered statistic ratios and their proper CFAR multipliers (e.g., based on multiplying up the denominator of the OSR). FIG. 6 illustrates a scatterplot 600 distribution of example radar data given estimates of a quantile median ratio (QMR) and estimates of an average OSR, for selecting a CFAR multiplier used during OSR CFAR detection with empirical data fitting, in accordance with the described techniques. The scatterplot 600 includes averaged estimated OSR values on the lateral axis and estimated Quantile-to-Median Ratio (QMR) values on the vertical axis. The gradient color scale is associated with the target angle of the test data. A size of each marker (i.e., circle) is proportional to a number of data points in the test data at a given angle and phase noise-to-thermal noise power ratio. The scatterplot 600 is an example of plotting the OSR for a particular distribution and an associated CFAR multiplier, in this case, referred to as the QMR. A function can be fit through these points (e.g., in a least square sense), which can serve as the mapping function $f$ between the estimated OSR and the applied CFAR multiplier. Note that there are average estimated OSR values which can have a range of estimated QMR values. In these regions of the test data, the false alarm rate may be difficult to maintain at a single, constant value. Instead, there can be a dependence on the particular distribution encountered as to the precise FAR that is observed.

Although described as a ratio between two values, the described techniques can be applied to evaluations of more than just two ordered-statistics. For examples, higher dimensional representations of the data (e.g., from extracting three or more ordered statistics or other values) to represent diversity in a distribution observed for mapping to a particular mapping function $f$. Executing at least some of the above steps in hardware (e.g., FPGA, SoC) can improve performance.

At 318, configuring a radar system to use the data set to select a desired quantile for evaluating whether a target response of radar data, for a given target angle and range bin, corresponds to the expected target response for that combination of target angle and range bin or to possible noise. For example, the data set is provided to the radar system 104 to enable evaluations of whether a target response of radar data, for a given target angle and range bin, corresponds to possible noise or the expected target response defined by the data set for that combination of target angle and range bin. The data set may include a look-up table or other data structure that enables quick determination of target responses given expected target responses (e.g., after Doppler processing and prior to angle estimating). For example, the computing system communicates with the radar system 104 to program the noise estimator 122 or 200 to utilize the empirically fit data for performing OSR CFAR detection. Step 318 links at A to the next part of the process 300.

Part Two: Osr Cfar Detection with Empirical Data Fitting Process

No matter how the empirically fit data is generated, when programmed into the radar system 104 (e.g., during a radar configuration update) in advance of driving, the empirically fit data enables the processor 114 (e.g., the noise estimator 122 or 200) to perform OSR CFAR detection with high accuracy. With the radar system 104 initialized or otherwise configured to utilize the empirically fit data generated from the first part of the process 300, the processor 114 can execute of the rest of the process 300. In continuing from step 318, the second part of the process 300 is shown in FIG. 3-2, to link at A and begin with step 320.

At 320, a plurality of radar signals into an environment, each of the radar signals transmitted with a unique combination of signal power and target angle. The radar system 104 causes the radar signals 110-1 to be broadcast in the environment 100.

At 322, radar returns corresponding to reflections of the radar signals off objects in the environment are received. For example, the radar system 104 detects the radar returns 110-2 in response to the radar signals 110-2 reflecting off objects in the environment 100, and in some cases, including noise.

At 324, the radar returns are sampled to generate non-coherently integrated radar data indicating a frame of possible target responses for each signal power and target angle combination represented by the radar signals. For example, the radar system 104 is configured to generate the data cube 118 to include NCI data after Doppler processing and/or prior to angle estimating. The data cube 118 indicates a radar response (e.g., signal power) across a plurality of range bins for each of a plurality of target angles for a single frame. This one frame of data can be evaluated for noise.

At 326, a sample vector of the radar data is obtained including possible target responses for a particular target angle across a plurality of range bins. For example, the sample vector 202 is obtained at the sort ordered-statistics stage 206.

At 328, from the possible target responses of the sample vector, multiple ordered statistics for the sample vector of the radar data are generated. For example, the power associated with the window cells of the sample vector 202 are used to derive the ordered-statistics 224. The ordered-statistics 224 represent a sorted list of values or attributes associated with each cell.

At 330, a ratio is determined between two of the multiple ordered statistics for the sample vector of the radar data. For example, the ordered-statistic 224-1 and 224-n are selected at the compute ratio stage 208. The same elements of the sample vector 202 are selected which are selected to generate the empirically fit data from the first part of the process 300. For example, the tenth and thirtieth elements may be used. In other cases, a median and higher order statistic than the median may be used.

At 332, an empirically fit data set is obtained that maps possible ordered statistic ratios at each target angle to desired quantiles defining expected target responses across the plurality of range bins. For example, the find multiplier stage 210 obtains the empirically fit data generated by the computing system during the multiple test frames and load the empirically fit data from memory for use in mapping to a desired quantile.

At 334, based on the ratio and from the empirically fit data set, a desired quantile for the sample vector of the radar data is determined, which defines an expected target response for the radar data at each range bin. For example, the ordered-statistics 224-1 and 224-n are input to the empirically fit data set to derive a CFAR multiplier to define the desired quantile for that sample vector 202.

At 336, based on the expected target response for a particular range bin of the sample vector of the radar data, a power threshold is determined for evaluating whether a possible target response in the radar data at that particular range bin and for that particular target angle corresponds to noise. For example, at the compute CFAR stage 212, the CFAR multiplier can be multiplied by one of the ordered-statistics 224-1 or 224-n to derive the CFAR threshold for the CUT 218. This can include multiplying the CFAR multiplier by a denominator of the CFAR ratio.

After execution of the process 300, noise can be filtered from the data cube 118 by filtering or otherwise modifying data from cells with signal amplitudes that do not satisfy the respective CFAR threshold for those cells. For example, each of the cells of the data cube 118 is filtered by the processor 114 using its respective CFAR threshold to eliminate false detections that appear because of unpredictable changes in noise. The radar system 104, through execution of the noise estimator 122 or 200, may determine that a possible target response is not noise in response to determining a signal power of the possible target response satisfies the power threshold. Likewise, the radar system 104 can determine that the possible target response is noise in response to determining the signal power of the possible target response does not satisfy the power threshold. In some examples, the CFAR threshold may apply to an entire sample vector (e.g., an entire target angle), whereas in other cases, the CFAR threshold is particular to each cell (e.g., a different among range bins of a particular angle).

In some cases, in addition or instead of filtering, the data cube 118 may be treated based on evaluations against each cell and its respective CFAR threshold. For example, after range processing and prior to applying a Doppler processing function and/or angle estimating to the radar data, the radar data may be treated in response to determining that the possible target is noise. This can include filtering the possible target response from the radar data further in response to determining that the possible target response is noise, as suggested above. In other examples, a noise tag can be applied to each cell of to the radar data that is suspected of being noise, to indicate that the possible target response in the radar data is noise. This way, the data cube 118 includes all the data, with information for subsequently filtering noise (e.g., during or after Doppler processing).

Responsive to filtering or treating the samples from the data cube, the data cube is output for use by a vehicle function in detecting objects that appear in the environment. For example, the data cube 118 is filtered for noise and then the measurement estimator 120 is configured to apply the Doppler processing function the radar data within the data cube 118, to determine a range-Doppler map. For example, through peak detection analysis, indications of objects (e.g., direction, range rate) can be computed accurately even in conditions where ambient noise is unpredictable. The range-Doppler map can be output from the radar system 104, e.g., to enable detections to be reported with a low constant false alarm rate. For example, the processor 114 outputs an indication of the data cube 118 for enabling other systems of the vehicle 102, or systems external to the vehicle 102, to track objects in the field of view 106 of the radar system 104.

Figure 7:
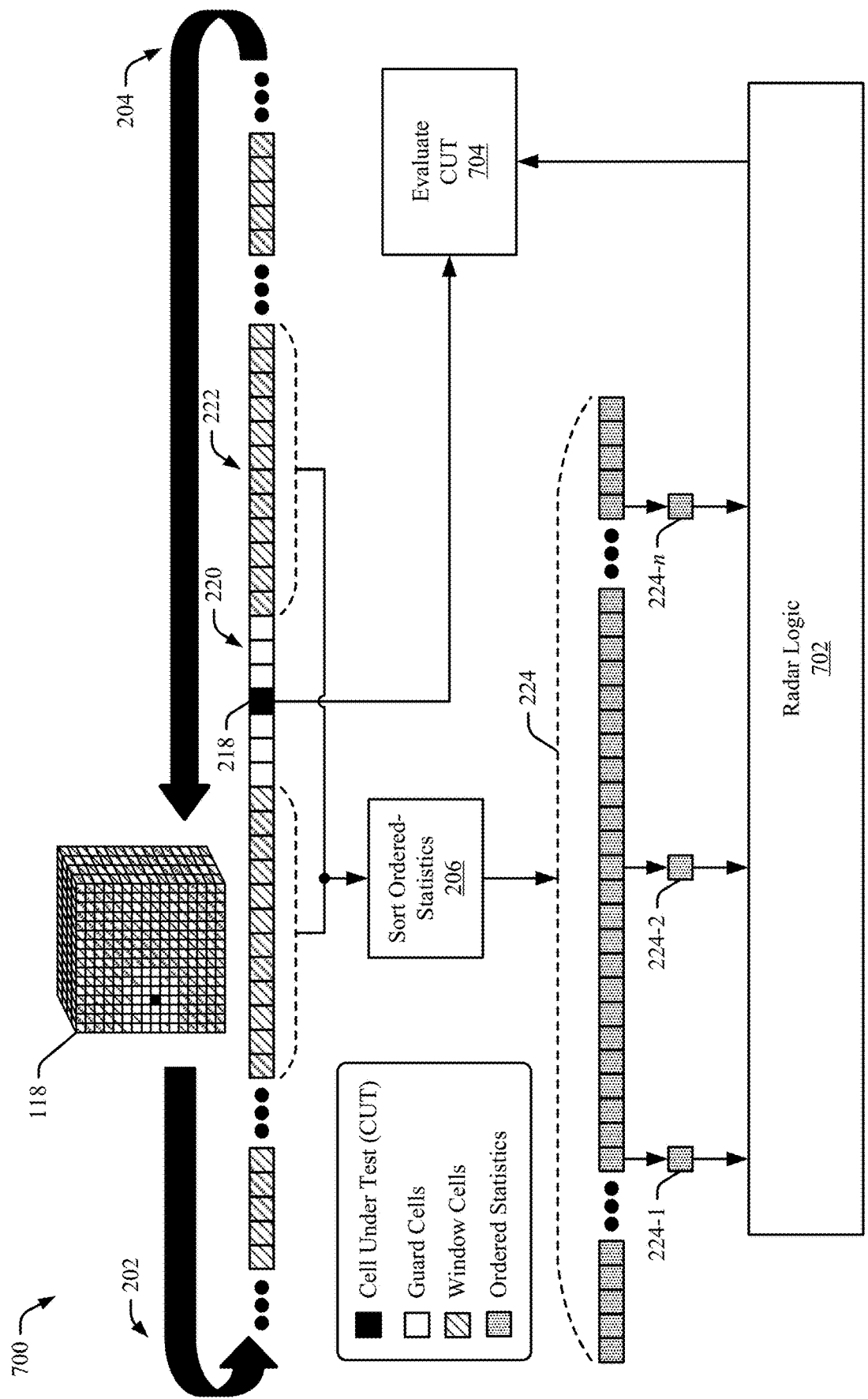
FIG. 7 illustrates a conceptual diagram of an example multiple-ordered statistic extractor for a radar system, in accordance with the described techniques.

FIG. 7 illustrates a conceptual diagram of an example multiple-ordered statistic extractor 700 for a radar system, in accordance with the described techniques. The conceptual diagram in FIG. 7 is similar to the conceptual diagram from FIG. 2. In FIG. 2, the noise estimator 200 uses a sliding window based approach to computes an ordered statistic ratio on a pixel-by-pixel basis (e.g., for each cell under test in a sample vector) and performs a comparison between the pixel and the cell-specific CFAR threshold at the evaluation stage 214. This approach differs from the multiple-ordered statistic extractor 700, as a CFAR threshold is determined using this example, for the entire sample vector 202 (e.g., based on the aggregated extracted ordered statistics for that entire vector).

The extractor 700 is configured to implement a sliding window multiple ordered statistic extraction technique. In this concept, an estimation window for each CUT 218 is slid across the sample vector 202 to be used for detection. At each position in the sample vector 202, the data is sorted in either ascending or descending order. Then, multiple ordered-statistics 224-1, 224-2, . . . , and 224-n are extracted from this list at the same time. This can save time as opposed to running the same data through a similar engine that is only capable of extracting a single ordered-statistic for just one cell under test, instead of ordered-statistics for multiple cells during each pass of the data. The extracted vectors of ordered statistics could be collapsed into scalar values and used for computing the ordered statistic ratio.

The output from the extractor 700 includes the multiple-ordered statistics that can be used by other radar logic 702 to evaluate the sample vector 202 at a cell under test evaluation stage 704. For example, the radar logic 702 may be a machine-learned (ML) model trained to output a CFAR threshold based on an input of at least two ordered-statistics, and in some cases, an entire sample vector of ordered-statistics (e.g., three or more).

Further Examples

Some further examples in view of the techniques described above include:

Example 1: A system comprising at least one processor configured to: receive test returns corresponding to a plurality of test signals that reflect from a single target, each of the test signals transmitted with a unique combination of signal power and target angle; sample the test returns over multiple frames to generate non-coherently integrated test data indicating multiple frames of target responses for each signal power and target angle combination represented by the test signals; determine, based on the multiple frames of target responses, a median power for each target angle at each one of a plurality of range bins; aggregate the test data into a plurality of sample vectors, each sample vector corresponding to a different target angle and indicating a combined target response at each of the range bins; generate multiple ordered statistics for each of the sample vectors, the multiple ordered statistics based on the combined target response at each of the range bins from that sample vector; determine a ratio between two ordered statistics from the multiple ordered statistics for each of the sample vectors; determine a desired quantile for each of the sample vectors to define an expected target response at each range bin of that sample vector, the desired quantile for each sample vector determined based in part on each combined target response from that sample vector; generate, based on the ratio and the desired quantile for each of the sample vectors, an empirically fit data set that maps possible ordered statistic ratios to desired quantiles for multiple combinations of target angles and range bins captured by the sample vectors; and provide the data set to a radar system to enable evaluations of whether a target response of radar data, for a given target angle and range bin, corresponds to possible noise or the expected target response defined by the data set for that combination of target angle and range bin.

Example 2: The system of any previous example, wherein at least one processor is configured to: select one of the two ordered statistics from the multiple ordered statistics to determine the ratio for the sample vector by selecting a median statistic from the multiple ordered statistics.

Example 3: The system of any previous example, wherein at least one processor is configured to: select another of the two ordered statistics from the multiple ordered statistics to determine the ratio for the sample vector by selecting a higher ordered statistic than the median statistic.

Example 4: The system of any previous example, wherein the higher ordered statistic is less than a highest ordered statistic from the multiple ordered statistics.

Example 5: The system of any previous example, further comprising a radar system comprising at least one processor configured to: transmit a plurality of radar signals into an environment, each of the radar signals transmitted with a unique combination of signal power and target angle; receive radar returns corresponding to reflections of the radar signals off objects in the environment; sample the radar returns to generate non-coherently integrated radar data indicating a frame of possible target responses for each signal power and target angle combination represented by the radar signals; obtain a sample vector of the radar data including possible target responses for a particular target angle across a plurality of range bins; generate, from the possible target responses of the sample vector, multiple ordered statistics for the sample vector of the radar data; determine a ratio between two of the multiple ordered statistics for the sample vector of the radar data; obtain an empirically fit data set that maps possible ordered statistic ratios at each target angle to desired quantiles defining expected target responses across the plurality of range bins; determine, based on the ratio and from the empirically fit data set, a desired quantile for the sample vector of the radar data defining an expected target response for the radar data at each range bin; and determine, based on the expected target response for a particular range bin of the sample vector of the radar data, a power threshold for evaluating whether a possible target response in the radar data at that particular range bin and for that particular target angle corresponds to noise.

Example 6: The system of any previous example, wherein the at least one processor is further configured to: determine that the possible target response does not comprise noise in response to determining a signal power of the possible target response satisfies the power threshold.

Example 7: The system of any previous example, wherein the at least one processor is further configured to: determine that the possible target response comprises noise in response to determining the signal power of the possible target response does not satisfy the power threshold.

Example 8: The system of any previous example, wherein the at least one processor is further configured to: prior to applying a Doppler processing function to the radar data, treat the radar data in response to determining that the possible target is noise.

Example 9: The system of any previous example, wherein the at least one processor is further configured to treat the radar data by: filtering the possible target response from the radar data further in response to determining that the possible target response is noise.

Example 10: The system of any previous example, wherein the at least one processor is further configured to treat the radar data by: applying a noise tag to the radar data indicating that the possible target response in the radar data is noise.

Example 11: The system of any previous example, wherein the at least one processor is further configured to: apply the Doppler processing function the radar data to determine a range-Doppler map; and output the range-Doppler map to enable detections to be reported with a low constant false alarm rate.

Example 12: A method, comprising: receiving test returns corresponding to a plurality of test signals that reflect from a single target, each of the test signals transmitted with a unique combination of signal power and target angle; sampling the test returns over multiple test frames to generate non-coherently integrated test data indicating multiple frames of target responses for each signal power and target angle combination represented by the test signals; determining, based on the multiple test frames of target responses, a median power for each target angle at each one of a plurality of range bins; aggregating the test data into a plurality of sample vectors, each sample vector corresponding to a different target angle and indicating a combined target response at each of the range bins; generating multiple ordered statistics for each of the sample vectors, the multiple ordered statistics based on the combined target response at each of the range bins from that sample vector; determining a ratio between two ordered statistics from the multiple ordered statistics for each of the sample vectors; determining a desired quantile for each of the sample vectors to define an expected target response at each range bin of that sample vector, the desired quantile for each sample vector determined based in part on each combined target response from that sample vector; generating, based on the ratio and the desired quantile for each of the sample vectors, an empirically fit data set that maps possible ordered statistic ratios to desired quantiles for multiple combinations of target angles and range bins captured by the sample vectors; and configuring a radar system to use the data set to select a desired quantile for evaluating whether a target response of radar data, for a given target angle and range bin, corresponds to the expected target response for that combination of target angle and range bin or to possible noise.

Example 13: The method of any previous example, further comprising: responsive to configuring the radar system to use the data set to evaluate target responses, operating the radar system to: transmit a plurality of radar signals into an environment, each of the radar signals transmitted with another unique combination of signal power and target angle; receive radar returns corresponding to reflections of the radar signals off objects in the environment; sample the radar returns to generate the radar data to be non-coherently integrated radar data indicating a single frame of possible target responses for each signal power and target angle combination represented by the radar signals; obtain a sample vector of the radar data including possible target responses for a particular target angle across a plurality of range bins; generate, from the possible target responses of the sample vector, multiple ordered statistics for the sample vector of the radar data; determine a ratio between two of the multiple ordered statistics for the sample vector of the radar data; determine, from the empirically fit data set and based on the ratio for the sample vector, a desired quantile for defining an expected target response for the radar data at each range bin; and determine, based on the expected target response for the radar data at a particular range bin of the sample vector, a power threshold for evaluating whether a possible target response at that particular range bin and for that particular target angle is noise.

Example 14: The method of any previous example, wherein operating the radar system further comprises: operating the radar system to determine that the possible target response does not comprise noise in response to determining a signal power of the possible target response satisfies the power threshold.

Example 15: The method of any previous example, wherein operating the radar system further comprises: operating the radar system to determine that the possible target response comprises noise in response to determining the signal power of the possible target response does not satisfy the power threshold.

Example 16: The method of any previous example, wherein operating the radar system further comprises: operating the radar system to treat the radar data in response to determining that the possible target is noise, prior to applying a Doppler processing function to the radar data.

Example 17: The method of any previous example, wherein operating the radar system to treat the radar data comprises: filtering the possible target response from the radar data further in response to determining that the possible target response is noise.

Example 18: The method of any previous example, wherein operating the radar system to treat the radar data comprises: applying a noise tag to the radar data indicating that the possible target response is noise.

Example 19: The method of any previous example, further comprising: operating the radar system to apply the Doppler processing function the radar data to determine a range-Doppler map; and operating the radar system to output the range-Doppler map to enable detections to be reported from the radar system with a low constant false alarm rate.

Example 20: The method of any previous example, wherein: one of the two of the multiple ordered statistics for the sample vector comprises a median statistic from the multiple ordered statistics for the sample vector; and another of the two of the multiple ordered statistics for the sample vector comprises a higher ordered statistic than the median statistic, wherein the higher ordered statistic is less than a highest ordered statistic from the multiple ordered statistics for the sample vector.

Example 21: A system comprising means for performing the method of any example above.

Example 22: A system comprising a processor configured to perform the method of any example above.

Example 23: A computer readable media including instructions that, when executed, cause a processor to perform the method of any example above.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to radar systems, problems associated with CFAR thresholding can occur in other systems (e.g., lidar systems) that process sensor point cloud detections in noisy environments, including driving situations. Therefore, although described to improve radar operations, the techniques of the foregoing description can be adapted and applied to other problems to effectively better detect objects using various types of sensors.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

I claim:

1. A system comprising at least one processor configured to:
receive test returns corresponding to a plurality of test signals that reflect from a single target, each of the test signals transmitted with a unique combination of signal power and target angle;
sample the test returns over multiple frames to generate non-coherently integrated test data indicating multiple frames of target responses for each signal power and target angle combination represented by the test signals;
determine, based on the multiple frames of target responses, a median power for each target angle at each one of a plurality of range bins;
aggregate the test data into a plurality of sample vectors, each sample vector corresponding to a different target angle and indicating a combined target response at each of the range bins;
generate multiple ordered statistics for each of the sample vectors, the multiple ordered statistics based on the combined target response at each of the range bins from that sample vector;
determine a ratio between two ordered statistics from the multiple ordered statistics for each of the sample vectors;
determine a desired quantile for each of the sample vectors to define an expected target response at each range bin of that sample vector, the desired quantile for each sample vector determined based in part on each combined target response from that sample vector;
generate, based on the ratio and the desired quantile for each of the sample vectors, an empirically fit data set that maps possible ordered statistic ratios to desired quantiles for multiple combinations of target angles and range bins captured by the sample vectors; and provide the data set to a radar system to enable evaluations of whether a target response of radar data, for a given target angle and range bin, corresponds to possible noise or the expected target response defined by the data set for that combination of target angle and range bin.

2. The system of claim 1, wherein the at least one processor is configured to: select one of the two ordered statistics from the multiple ordered statistics to determine the ratio for the sample vector by selecting a median statistic from the multiple ordered statistics.

3. The system of claim 2, wherein the at least one processor is configured to: select another of the two ordered statistics from the multiple ordered statistics to determine the ratio for the sample vector by selecting a higher ordered statistic than the median statistic.

4. The system of claim 3, wherein the higher ordered statistic is less than a highest ordered statistic from the multiple ordered statistics.

5. A radar system comprising at least one processor configured to:

transmit a plurality of radar signals into an environment, each of the radar signals transmitted with a unique combination of signal power and target angle;

receive radar returns corresponding to reflections of the radar signals off objects in the environment;

sample the radar returns to generate non-coherently integrated radar data indicating a frame of possible target responses for each signal power and target angle combination represented by the radar signals;

obtain a sample vector of the radar data including possible target responses for a particular target angle across a plurality of range bins;

generate, from the possible target responses of the sample vector, multiple ordered statistics for the sample vector of the radar data;

determine a ratio between two of the multiple ordered statistics for the sample vector of the radar data;

obtain an empirically fit data set that maps possible ordered statistic ratios at each target angle to desired quantiles defining expected target responses across the plurality of range bins;

determine, based on the ratio and from the empirically fit data set, a desired quantile for the sample vector of the radar data defining an expected target response for the radar data at each range bin; and determine, based on the expected target response for a particular range bin of the sample vector of the radar data, a power threshold for evaluating whether a possible target response in the radar data at that particular range bin and for that particular target angle corresponds to noise.

6. The system of claim 5, wherein the at least one processor is further configured to:

determine that the possible target response does not comprise noise in response to determining a signal power of the possible target response satisfies the power threshold.

7. The system of claim 6, wherein the at least one processor is further configured to:

determine that the possible target response comprises noise in response to determining the signal power of the possible target response does not satisfy the power threshold.

8. The system of claim 7, wherein the at least one processor is further configured to: prior to applying a Doppler processing function to the radar data, treat the radar data in response to determining that the possible target response is noise.

9. The system of claim 8, wherein the at least one processor is further configured to treat the radar data by:

filtering the possible target response from the radar data further in response to determining that the possible target response is noise.

10. The system of claim 8, wherein the at least one processor is further configured to treat the radar data by:

applying a noise tag to the radar data indicating that the possible target response in the radar data is noise.

11. The system of claim 8, wherein the at least one processor is further configured to:

apply the Doppler processing function to the radar data to determine a range-Doppler map; and output the range-Doppler map to enable detections to be reported with a low constant false alarm rate.

12. A method, comprising:

receiving test returns corresponding to a plurality of test signals that reflect from a single target, each of the test signals transmitted with a unique combination of signal power and target angle;

sampling the test returns over multiple test frames to generate non-coherently integrated test data indicating multiple frames of target responses for each signal power and target angle combination represented by the test signals;

determining, based on the multiple test frames of target responses, a median power for each target angle at each one of a plurality of range bins;

aggregating the test data into a plurality of sample vectors, each sample vector corresponding to a different target angle and indicating a combined target response at each of the range bins;

generating multiple ordered statistics for each of the sample vectors, the multiple ordered statistics based on the combined target response at each of the range bins from that sample vector;

determining a ratio between two ordered statistics from the multiple ordered statistics for each of the sample vectors;

determining a desired quantile for each of the sample vectors to define an expected target response at each range bin of that sample vector, the desired quantile for each sample vector determined based in part on each combined target response from that sample vector;

generating, based on the ratio and the desired quantile for each of the sample vectors, an empirically fit data set that maps possible ordered statistic ratios to desired quantiles for multiple combinations of target angles and range bins captured by the sample vectors; and configuring a radar system to use the data set to select a desired quantile for evaluating whether a target response of radar data, for a given target angle and range bin, corresponds to the expected target response for that combination of target angle and range bin or to possible noise.

13. The method of claim 12, further comprising:

responsive to configuring the radar system to use the data set to evaluate target responses, operating the radar system to:

transmit a plurality of radar signals into an environment, each of the radar signals transmitted with another unique combination of signal power and target angle;

receive radar returns corresponding to reflections of the radar signals off objects in the environment;

sample the radar returns to generate the radar data to be non-coherently integrated radar data indicating a single frame of possible target responses for each signal power and target angle combination represented by the radar signals;

obtain a sample vector of the radar data including possible target responses for a particular target angle across a plurality of range bins;

generate, from the possible target responses of the sample vector, multiple ordered statistics for the sample vector of the radar data;

determine a ratio between two of the multiple ordered statistics for the sample vector of the radar data;

determine, from the empirically fit data set and based on the ratio for the sample vector, a desired quantile for defining an expected target response for the radar data at each range bin; and determine, based on the expected target response for the radar data at a particular range bin of the sample vector, a power threshold for evaluating whether a possible target response at that particular range bin and for that particular target angle is noise.

14. The method of claim 13, wherein operating the radar system further comprises:

operating the radar system to determine that the possible target response does not comprise noise in response to determining a signal power of the possible target response satisfies the power threshold.

15. The method of claim 14, wherein operating the radar system further comprises:

operating the radar system to determine that the possible target response comprises noise in response to determining the signal power of the possible target response does not satisfy the power threshold.

16. The method of claim 15, wherein operating the radar system further comprises: operating the radar system to treat the radar data in response to determining that the possible target response is noise, prior to applying a Doppler processing function to the radar data.

17. The method of claim 16, wherein operating the radar system to treat the radar data comprises:

filtering the possible target response from the radar data further in response to determining that the possible target response is noise.

18. The method of claim 16, wherein operating the radar system to treat the radar data comprises:

applying a noise tag to the radar data indicating that the possible target response is noise.

19. The method of claim 16, further comprising: operating the radar system to apply the Doppler processing function to the radar data to determine a range-Doppler map; and operating the radar system to output the range-Doppler map to enable detections to be reported from the radar system with a low constant false alarm rate.

20. The method of claim 13, wherein:

one of the two of the multiple ordered statistics for the sample vector comprises a median statistic from the multiple ordered statistics for the sample vector; and another of the two of the multiple ordered statistics for the sample vector comprises a higher ordered statistic than the median statistic, wherein the higher ordered statistic is less than a highest ordered statistic from the multiple ordered statistics for the sample vector.

* * * * *

UNITED STATES PATENT AND TRADEMARK OFFICE
CERTIFICATE OF CORRECTION

PATENT NO. : 12,174,312 B2
APPLICATION NO. : 17/814659
DATED : December 24, 2024
INVENTOR(S) : Christopher David Gianelli Page 1 of 1

It is certified that error appears in the above-identified patent and that said Letters Patent is hereby corrected as shown below:

On the Title Page

Page 2, Column 2, Item (56) Other Publications, Line 5: Delete "Evanon," and insert --Levanon,-- therefor Signed and Sealed this
Fifteenth Day of April, 2025

Coke Morgan Stewart
*Acting Director of the United States Patent and Trademark Office*